US010812546B2

(12) United States Patent
Ramamurthi et al.

(10) Patent No.: US 10,812,546 B2
(45) Date of Patent: Oct. 20, 2020

(54) LINK-AWARE STREAMING ADAPTATION

(71) Applicant: Intel IP Corporation, Santa Clara, CA (US)

(72) Inventors: Vishwanath Ramamurthi, Sunnyvale, CA (US); Ozgur Oyman, San Jose, CA (US); Mohamed M. Rehan, Cairo (EG); Ahmed N. Ragab, Giza (EG)

(73) Assignee: Intel IP Corporation, Santa Clara, CA (US)

( * ) Notice: Subject to any disclaimer, the term of this patent is extended or adjusted under 35 U.S.C. 154(b) by 199 days.

(21) Appl. No.: 14/583,034

(22) Filed: Dec. 24, 2014

(65) Prior Publication Data

US 2016/0191585 A1 Jun. 30, 2016

(51) Int. Cl.
*H04L 29/06* (2006.01)
*H04L 12/26* (2006.01)
*H04L 29/08* (2006.01)
*H04W 24/08* (2009.01)

(52) U.S. Cl.
CPC ...... *H04L 65/4084* (2013.01); *H04L 43/0888* (2013.01); *H04L 65/4092* (2013.01); *H04L 65/80* (2013.01); *H04L 67/02* (2013.01); *H04L 69/323* (2013.01); *H04W 24/08* (2013.01)

(58) Field of Classification Search
CPC ............ H04L 65/4084; H04L 43/0888; H04L 65/4092; H04L 65/80; H04L 67/02; H04L 69/323; H04W 24/08
See application file for complete search history.

(56) References Cited

U.S. PATENT DOCUMENTS

| | | | |
|---|---|---|---|
| 7,149,291 B1 * | 12/2006 | Deshpande | H04L 47/10 379/112.01 |
| 8,089,939 B1 * | 1/2012 | Mater | H04W 36/30 370/332 |
| 2004/0196860 A1 * | 10/2004 | Gao | H04L 1/1812 370/437 |

(Continued)

FOREIGN PATENT DOCUMENTS

| | | |
|---|---|---|
| CN | 103475906 | 12/2013 |
| CN | 103535047 | 12/2013 |

(Continued)

OTHER PUBLICATIONS

Vishwanath Ramamurthi and Ozgur Oyman, "Link Aware HTTP Adaptive Streaming for Enhanced Quality of Experience", Intel Labs, Santa Clara, USA, Globecom 2013—Communications Software, Services and Multimedia Symposium.*

(Continued)

*Primary Examiner* — Tonia L Dollinger
*Assistant Examiner* — Jihad K Boustany
(74) *Attorney, Agent, or Firm* — Alliance IP, LLC

(57) ABSTRACT

Technology to provide link aware streaming adaptation is disclosed. In an example, a mobile device can include one or more processors configured to: process a manifest file for an HTTP adaptive stream that is received at the mobile device from a node; determine a physical layer goodput of the mobile device with the node for the HAS; identify a segment throughput estimate for the HAS; and select a representation in the manifest file for a selected period based, on the physical layer goodput for the HAS and the segment throughput for the HAS.

18 Claims, 12 Drawing Sheets

(56) References Cited

U.S. PATENT DOCUMENTS

| | | | | |
|---|---|---|---|---|
| 2012/0013746 | A1* | 1/2012 | Chen | G11B 27/034 348/180 |
| 2014/0040496 | A1* | 2/2014 | Moorthy | H04L 65/4084 709/231 |
| 2014/0095670 | A1* | 4/2014 | Ozgur | H04W 52/0258 709/219 |
| 2014/0201324 | A1* | 7/2014 | Zhang | H04L 65/4084 709/217 |
| 2014/0317234 | A1* | 10/2014 | Mueller | H04L 67/02 709/217 |
| 2015/0146778 | A1* | 5/2015 | De Cicco | H04N 19/149 375/240.07 |

FOREIGN PATENT DOCUMENTS

| | | |
|---|---|---|
| CN | 104205734 | 12/2014 |
| WO | WO 2014/134309 | 9/2014 |

OTHER PUBLICATIONS

Vishwanath Ramamurthi and Ozgur Oyman, "Link Aware HTTP Adaptive Streaming for Enhanced Quality of Experience", Intel Labs, Santa Clara, USA, Globecom 2013—Communications Software, Service and Multimedia Symposium.*

Vishwanath Ramamurthi and Ozgur Oyman, "Link Aware HTTP Adaptive Streaming for Enhanced Quality of Experience", Intel Labs, Santa Clara, USA, Globecom 2013—Communications Software, Service and Multimedia Symposium (Year: 2013).*

Ramamurthi Vishwanath et al.: "Link aware HTTP Adaptive Streaming for enhanced quality of experience", 2013 IEEE Global Communications Conference, As accessed on this date: Apr. 2, 2016.

Ramamurthi Vishwanath et al.:"Video-QoE aware radio resource allocation for HTTP adaptive streaming", As accessed on this date: Apr. 2, 2016.

Lin Qi et al.: "Bandwidth estimation of rate adaption algorithm in DASH", As accessed on this date: Apr. 2, 2016.

3GPP TS 26,247: Transparent end-to-end packet switched streaming service (PSS); Progressive download and dynamic adaptive streaming over HTTP (3GP-DASH) As accessed on this date: Feb. 11, 2014.

ISO/IEC Dis 23009-1,"Information Technology-Dynamic Adaptive Streaming Over HTTP (DASH)—Part 1: Media Presentation Description and Segment Formats" 4 As accessed on this date: Feb. 11, 2014.

Lederer, Stefan, C. Muller, and Christian Timmerer."Towards peer-assisted dynamic adaptive streaming over HTTP." Packet Video Workshop (PV), 2012 19$^{th}$ International, IEEE, 2012. As accessed on this date: Jan. 6, 2014.

Rovcanin, Lejla; Muntean, Gabriel-Miro, "A DASH-based performance-oriented Adaptive Video distribution solution," Broadband Multimedia Systems and Broadcasting (BMSB), 2013 IEEE International Symposium on, vol., no., pp. 1,7, Jun. 5-7, 2013. As accessed on this date: Jan. 6, 2014.

* cited by examiner

LINK-AWARE STREAMING ADAPTATION

BACKGROUND

The growth of multimedia services, including streaming and conversational services, is one of the key drivers of the evolution to new mobile broadband technologies and standards. Digital video content is increasingly consumed in mobile devices. There are many video applications extensively used on mobile devices in daily life. For example, online video streaming include popular services such as YouTube and Hulu. Video recording and video conferencing include services such as Skype and Google Hangout. In 2013, YouTube had more than 1 billion mobile video views per day. As more smart phones, tablets, and other mobile computing devices are purchased, their use for video recording and video conferencing will increase dramatically. With such high consumer demand for multimedia services coupled with developments in media compression and wireless network infrastructures, it is of interest to enhance the multimedia service capabilities of future cellular and mobile broadband systems and deliver high quality of experience (QoE) to the consumers, thereby ensuring ubiquitous access to video content and services from any location, at any time, with any device and technology.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
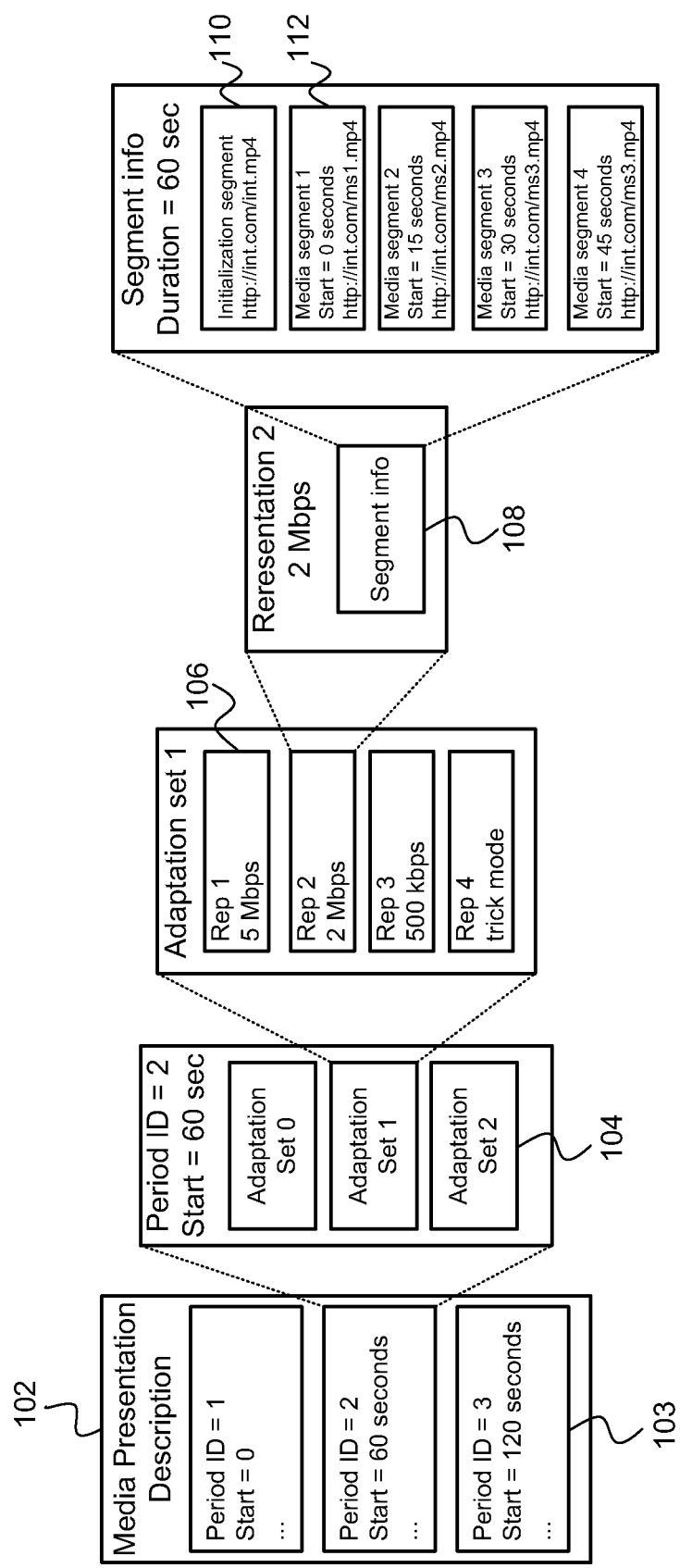
FIG. 1 illustrates a block diagram of a media presentation description (MPD) metadata file configuration in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Hypertext transfer protocol (HTTP) adaptive streaming (HAS) can be used as a form of multimedia delivery of Internet video. HTTP-based delivery can provide reliability and deployment simplicity due to a broad adoption of both HTTP and HTTP's underlying protocols, including transmission control protocol (TCP)/internet protocol (IP). HTTP-based delivery can enable easy and effortless streaming services by avoiding network address translation (NAT) and firewall traversal issues. HTTP-based delivery or streaming can also provide the ability to use standard HTTP servers and caches instead of specialized streaming servers. HTTP-based delivery can provide scalability due to minimal or reduced state information on a server side.

When using HAS to deliver internet multimedia content, a video client operating on a mobile device can be configured to perform the primary role in rate adaptation by choosing and requesting the appropriate video representation levels from a video server using an HTTP GET or partial GET command to retrieve data from a specified resource, such as a multimedia server. The video client initially builds up a buffer to a certain level before beginning to playback streaming multimedia content, such as audio or video. This phase is referred to as the startup phase. After this, the client begins playback of the buffered multimedia content.

The quality and resolution of the multimedia playback at the client device is dependent on the available link bandwidth. The video client typically estimates the available link bandwidth based only on higher layer throughput estimates, such as HTTP-level video streaming throughput, or on transmission control protocol (TCP) throughput. Such an approach has limitations in tracking rapid variations in channel conditions which occur in wireless networks. These limitations in tracking the variations can limit the ability of rate adaptation algorithms to adapt to variations in link conditions. In addition, the use of higher layer throughput estimates to estimate available link bandwidth is not available before the first few video frames are received.

In accordance with one embodiment of the present invention, a better estimate of the available bandwidth can be provided for HAS in a wireless network by using a physical layer aware video adaptation approach for HAS systems, such as systems configured to use the dynamic adaptive streaming over HTTP (DASH) standard. This approach is especially suited for wireless links whose characteristics fluctuate with time, depending on the physical environment as well as on the load on the system.

However, the use of only the physical layer throughput can also have limitations. Physical layer throughput can have relatively rapid changes due to changes in transmission conditions, such as a change in the location of a mobile device.

In one embodiment, the available link bandwidth information can be estimated based on physical layer throughput information as a complement to higher layer estimates at the transport or application layers. In a cellular scenario such information can be provided by the radio of the User Equipment (UE) to the video adaptation module of a HAS client.

The use of link bandwidth information can be used as an optional feature in HAS, wherein PHY layer throughput can be used for video rate adaptation only when certain conditions regarding link condition, buffer status, or other desired criteria are met. For example, PHY layer throughput can be used when a good estimate of the higher layer throughputs is unavailable. Higher layer throughput estimates can be limited in accuracy at the beginning of the streaming session. Also PHY layer throughput can be used when wireless channel conditions are varying relatively rapidly. A threshold can be set to determine the amount of variation in the wireless channel conditions that causes the physical layer goodput measurement to be used in place of the higher layer throughput estimate. The threshold level can vary based on system design and use. In one embodiment, if the higher layer throughput estimate reduces the actual throughput of a number of video frames of the HAS by more than a selected percentage relative to the use of the physical layer goodput, then the physical layer goodput can be used. The threshold may vary from a small percentage, such as 0.1 percent, to a relatively high percentage, such as 20 percent or more, depending on the type of system in which the wireless device operates.

When there are frequent changes in channel conditions, such as when a wireless device is moving, the higher layer throughput estimates are late in following the change in wireless link conditions. Rapid wireless channel variations can be inferred by observing the trend of the physical layer throughput over time. The ability to use the physical layer throughput estimates enables a multimedia player to opportunistically adapt to channel fluctuations and improve user Quality of Experience (QoE) by addressing key performance metrics of re-buffering percentage and user video quality.

In one embodiment, the use of video rate-adaptation algorithms that opportunistically adapt the video rate based on physical layer link conditions and buffer status can be used to improve startup video quality under tolerable startup delay and to reduce re-buffering during video playback. Accordingly, the QoE for the user can be significantly improved. This will be discussed further in the proceeding paragraphs.

Wireless Multimedia Standards

There have been a number of multimedia standards that have been developed to enable multimedia to be communicated to, from, or between mobile computing devices. For instance, in streaming video, the third generation partnership project (3GPP) has developed technical specification (TS) 26.234 (e.g. Release 11.0.0) that describes packet-switched streaming services (PSS) that are based on the real-time streaming protocol (RTSP) for unicast streaming of on-demand or live content. In addition, hyper-text transfer protocol (HTTP) based streaming services, including progressive download and dynamic adaptive streaming over HTTP (DASH), are described in 3GPP TS 26.247 (e.g. Release 11.0.0). 3GPP-based multimedia broadcast and multicast services (MBMS) specification TS 26.346 (e.g. Release 11.0.0) specifies streaming and download techniques for multicast/broadcast content distribution. As such, DASH/PSS/MBMS-based mobile computing devices, such as user equipment (UEs), decode and render streamed videos at the UE devices. Support for the 3GP file format in 3GPP TS 26.244 (e.g. Release 11.0.0) is mandated in all of these specifications to support file download and HTTP-based streaming use cases.

One example of a standard for conversational video communication, such as video conferencing, is provided in 3GPP TS 26.114 (e.g. 11.0.0). The standard describes the multimedia telephony services over IMS (MTSI) that allows delivery of advanced multimedia conversational services and content over internet protocol (IP) multimedia subsystems (IMS) based networks. IMS is standardized in 3GPP TS 26.140 (e.g. Rel. 11.0.0). An MTSI-based transmitter UE terminal can capture and record video, and then transfer the video to an MTSI-based receiver UE terminal over a 3GPP network. The receiver UE terminal can then decode and render the video. The 3GPP TS 26.140 also enables video sharing using multimedia sharing services (MMS), in which support for the 3GP file format is provided.

The standards described above are provided as examples of wireless multimedia standards that can be used to communicate multimedia files to, from, and/or between multimedia devices. The examples are not intended to be limiting. Additional standards may be used to provide streaming video, conversational video, or video sharing.

Streaming Media Standards

A more detailed explanation of HTTP streaming, and more particularly, the DASH standard is provided herein, in context with embodiments of the present invention. The detailed explanation is not intended to be limiting. As will be further explained in the proceeding paragraphs, the embodiments of the present invention can be used to efficiently communicate multimedia to, from, and/or between mobile devices by enabling the mobile devices, or the servers in communication with the mobile devices, to select and/or communicate multimedia having a desired energy characterization. The multimedia can be communicated using a standardized or non-standardized communication scheme.

Hypertext transfer protocol (HTTP) streaming can be used as a form of multimedia delivery of Internet video. In HTTP streaming, a multimedia file can be partitioned into one or more segments and delivered to a client using the HTTP protocol. HTTP-based delivery can provide reliability and deployment simplicity due to a broad adoption of both HTTP and HTTP's underlying protocols, including transmission control protocol (TCP)/internet protocol (IP).

HTTP-based delivery can enable simplified streaming services by avoiding network address translation (NAT) and firewall traversal issues. HTTP-based delivery or streaming can also provide the ability to use standard HTTP servers and caches instead of specialized streaming servers. HTTP-based delivery can provide scalability due to minimal or reduced state information on a server side. Examples of HTTP streaming technologies can include Microsoft IIS Smooth Streaming, Apple HTTP Live Streaming, and Adobe HTTP Dynamic Streaming.

DASH is a standardized HTTP streaming protocol. As illustrated in FIG. 1, DASH can specify different formats for a media presentation description (MPD) metadata file 102 that provides information on the structure and different versions of the media content representations stored in the server as well as the segment formats. The MPD metadata file contains information on the initialization and media segments for a media player (e.g., the media player can look at initialization segment to determine a container format and media timing information) to ensure mapping of segments into a media presentation timeline for switching and synchronous presentation with other representations. DASH technology has also been standardized by other organizations, such as the Moving Picture Experts Group (MPEG), Open IPTV Forum (OIPF), and Hybrid Broadcast Broadband TV (HbbTV).

A DASH client can receive multimedia content by downloading the segments through a series of HTTP request-response transactions. DASH can provide the ability to dynamically switch between different bit rate representations of the media content as the bandwidth that is available to a mobile device changes. Thus, DASH can allow for fast adaptation to changing network and wireless link conditions, user preferences and device capabilities, such as display resolution, the type of central processing unit (CPU) employed, the memory resources available, and so forth. The dynamic adaptation of DASH can provide a better quality of experience (QoE) for a user, with shorter startup delays and fewer rebuffering events than other streaming protocols.

Figure 2:
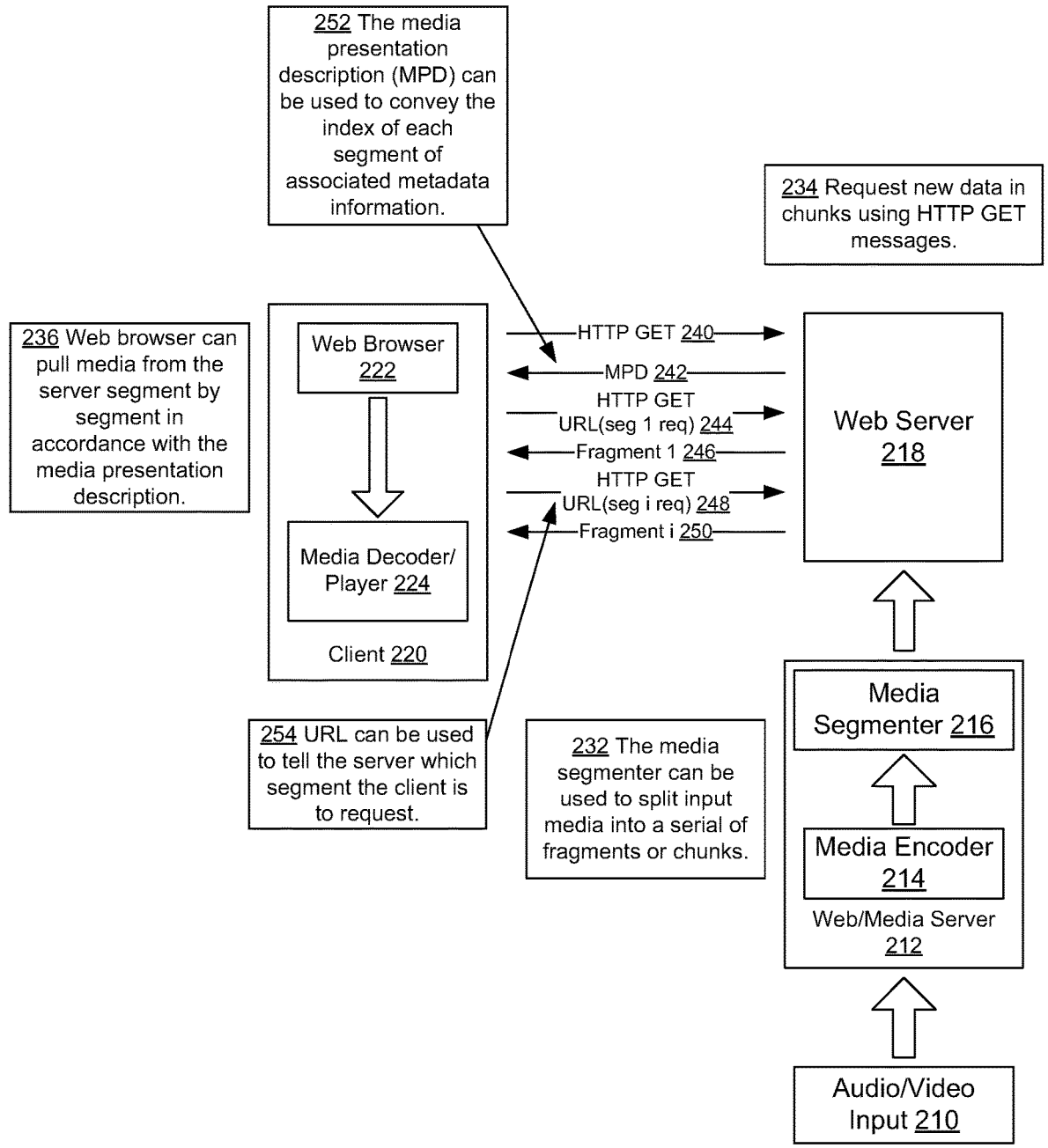
FIG. 2 illustrates a block diagram of hypertext transfer protocol (HTTP) streaming in accordance with an example.

In DASH, a media presentation description (MPD) metadata 102 can provide information on the structure and different versions of the media content representations stored in a web/media server 212, as illustrated in FIG. 2. The MPD metadata can be communicated in a manifest file. In the example illustrated in FIG. 1, the MPD metadata is temporally divided into periods having a predetermined length, such as 60 seconds in this example. Each period can include a plurality of adaptation sets 104. Each adaptation set can provide information about one or more media components with a number of encoded alternatives. For example, adaptation set 0 in this example might include a variety of differently encoded audio alternatives, such as different bit rates, mono, stereo, surround sound, and so forth. In addition to offering different quality audio for a multimedia presentation over the period ID, the adaptation set may also include audio in different languages. The different alternatives offered in the adaptation set are referred to as representations 106.

In FIG. 1, Adaptation set 1 is illustrated as offering video at different bitrates, such as 5 mega-bits per second (Mbps), 2 Mbps, 500 kilo-bits per second (kbps), or a trick mode. The trick mode can be used for seeking, fast forwarding, rewinding, or other changes in location in the multimedia streaming file. In addition, the video may also be available in different formats, such as two dimensional (2D) or three dimensional (3D) video. Each representation 106 can include segment information 108. The segment information can include initialization information 110 and the actual media segment data 112. In this example, an MPEG 4 (MP4) file is streamed from a server to a mobile device. While MP4 is used in this example, a wide variety of different codecs may be used, as previously discussed.

The multimedia in the adaptation set can be further divided into smaller segments. In the example of FIG. 1, the 60 second video segment of adaptation set 1 is further divided into four sub-segments 112 of 15 seconds each. These examples are not intended to be limiting. The actual length of the adaptation set and each media segment or sub-segment is dependent on the type of media, system requirements, potential types of interference, and so forth. The actual media segments or sub-segments may have a length that is less than one second to several minutes long.

As shown in FIG. 2, the MPD metadata information can be communicated to a client 220, such as a mobile device. A mobile device can be a wireless device configured to receive and display streaming media. In one embodiment, the mobile device may only perform part of this function, such as receiving the streaming media and then communicating it to another device or a display device for rendering. The mobile device can be configured to run a client 220. The client can request the segments using an HTTP GET 240 message or a series of partial GET messages. The client can control the streaming session, such as managing an on-time request and smooth play-out of a sequence of segments, or potentially adjusting bitrates or other attributes, to react to changes of a wireless link, a device state or a user preference.

FIG. 2 illustrates a DASH-based streaming framework. A media encoder 214 in the web/media server 212 can encode an input media from an audio/video input 210 into a format for storage or streaming. A media segmenter 216 can be used to split the input media into a series of segments 232, which can be provided to a web server 218. The client 220 can request new data in segments using HTTP GET messages 234 sent to the web server (e.g., HTTP server).

For example, a web browser 222 of the client 220 can request multimedia content using a HTTP GET message 240. The web server 218 can provide the client with a MPD 242 for the multimedia content. The MPD can be used to convey the index of each segment and the segment's corresponding locations as shown in the associated metadata information 252. The web browser can pull media from the server segment by segment in accordance with the MPD 242 as shown in 236. For instance, the web browser can request a first segment using a HTTP GET URL (frag 1 req) 244. A uniform resource locator (URL) or universal resource locator can be used to tell the web server which segments the client is to request 254. The web server can provide the first fragment (i.e., segment 1 246). For subsequent segments, the web browser can request a segment i using a HTTP GET URL (frag i req) 248, where i is an integer index of the segment. As a result, the web server can provide a segment i 250. The segments can be presented to the client via a media decoder/player 224.

Figure 3:
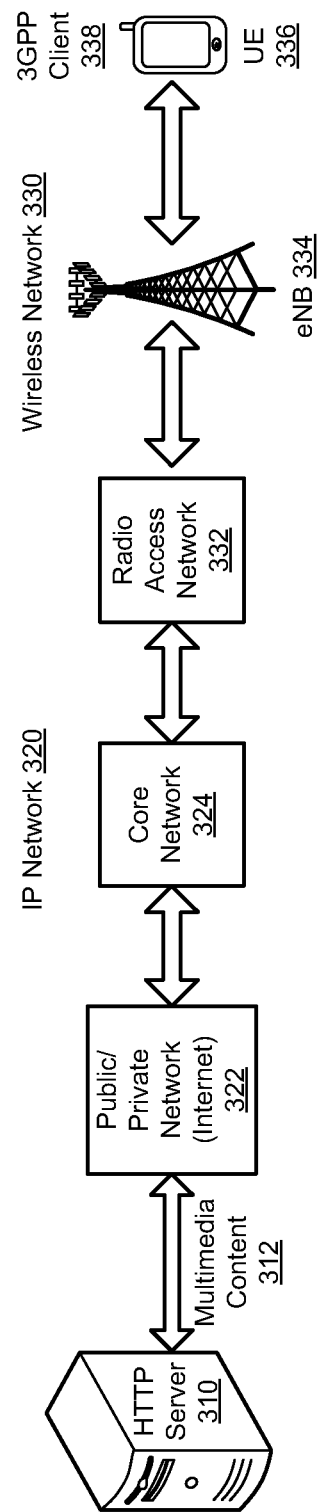
FIG. 3 illustrates a block diagram of a radio access network (RAN) architecture for hypertext transfer protocol-based (HTTP-based) link aware adaptive streaming in accordance with an example.

FIG. 3 illustrates a flow of multimedia content 312 between an HTTP server 310 providing the multimedia content to a 3GPP client 338 operating on a mobile device, such as a UE 336. The HTTP server can interface with a public or private network 322 (or the Internet) in communication with a core network 324 of a wireless wide area network (WWAN). In one embodiment, the WWAN can be a 3GPP LTE based network or an IEEE 802.16 based network (i.e. 802.16-2009). The core network can access a wireless network 330, such as an evolved packet system (EPS) via a radio access network (RAN) 332. The RAN can provide the multimedia content to the client operating on the UE via a node (e.g., an evolved Node B (eNB) 334). In addition, a WLAN network can also be implemented between the HTTP server and the UE. The WLAN network may be an IEEE 802.11 network, including, but not limited to, IEEE 802.11a, 802.11b, 802.11g, 802.11n, 802.11ac, and 802.11ad. The WLAN can provide multimedia content to the client operating on the UE via an access point (AP). Additional types of WLAN networks can also be used, such as a Bluetooth network, or other short range network.

Link Aware Streaming Adaptation

In accordance with one embodiment, a system with multiple wireless video users being served by a base-station is disclosed. Although the system contains multiple video clients, each client can act independently of other clients. The different representations of a video requested by a representative client can be indexed using letter k. The value k=1 can be set to represent the lowest bitrate representation level and k=N can represents the highest representation level. The variable $b_k$ can represent the bitrate of encoded video of representation level k, where $b_1 \leq b_2 \leq b_3 \leq \ldots \leq b_N$.

The rates of different video representation levels in an MPD can be communicated to the client by the server in the MPD. This takes place prior to the commencement of the streaming of multimedia. The play out process and rate adaptation can take place in time granularity of video frame duration $\tau$. Video frame duration $\tau$ is the reciprocal of the video frame rate $F_r$ i.e., $\tau=1/F_r$. A certain video frame duration is called a frameslot. Each frameslot can be indexed using the letter i.

HTTP Segment Throughput

A typical higher layer throughput estimate is the fragment or segment throughput which is defined as the average ratio of segment size to the download time of the segment:

$$R_i^{seg}(t) = \frac{1}{F} \sum_{j=S_t-F+1}^{S_t} \frac{S_{seg}(j)}{T_{dwnd}^{seg}(j) - T_{fetch}^{seg}(j)}, \quad (1)$$

where Sfrag(j), $T_{download}^{frag}$(j) and $T_{fetch}^{frag}$(j) are the size, download time and fetch time of the jth video fragment requested, $S_t$ is the most recent fragment requested till time t, and F is the number of segments used for averaging to get a stable estimate.

Physical Layer Goodput

To enable the video rate adaptation algorithm to opportunistically adapt to the fluctuations of the radio link throughput, an estimate of the physical layer goodput can be performed and used for video rate adaptation. Goodput is the physical level throughput. The throughput is the number of useful information bits delivered by the network to a certain destination, such as a UE, per unit of time. The throughput data excludes protocol overhead bits as well as retransmitted data packets.

If $X_i$ is the number of successfully received bits in the $i^{th}$ video frameslot, the physical layer goodput in the $i^{th}$ frameslot is given by:

$$R_i^{PHY} = \frac{X_i}{\tau}$$

The average physical goodput in the $i^{th}$ frameslot is the average of the physical layer goodput over the past T frameslots i.e., $$R_i^{PHY-Avg} = \frac{1}{T} \sum_{t=0}^{T-1} R_{i-t}^{PHY}$$

The average PHY layer goodput can also be defined as the ratio of the number of bits received during a certain time period to the duration of the time period:

$$R^{phy}(t) = \frac{X(t) - X(t-T)}{T_{Rx}},$$

where X(t) is the number of bits received till time t, T is the duration of feedback, and $T_{Rx} \leq T$ is the sub-duration during which the UE is expecting data. The estimation of the average physical layer goodput typically involves collaboration with the physical layer. For example, the estimation can be computed by the PHY layer for every burst of data received by the PHY layer and reported to the application layer periodically through an API (Application Program Interface).

Throughput Measurement Using Higher Layers

Traditionally, higher layer throughput estimates at the TCP or application layers have been used for estimating the available link bandwidth for video rate adaptation in a HAS. Examples of higher layer throughput estimates are provided in the proceeding paragraphs.

Average Video Fragment Throughput

Average video fragment is the average throughput experienced while downloading video fragments, as illustrated in the following equation:

$$R_i^{Fragment} = \frac{1}{F} \sum_{j=L_F-F+1}^{L_F} \frac{S_{frag}(j)}{T_{dwnd}^{frag}(j) - T_{fetch}^{frag}(i)}$$

where $S_{frag}$(j), $T_{download}^{frag}$(j) and $T_{fetch}^{frag}$(i) are the size, download time and fetch time of the $j^{th}$ video fragment requested, respectively. The variable $L_F$ is the most recent fragment requested, and F is the number of segments used for averaging. This is a conservative estimate of the bandwidth. Because this throughput estimate involves averaging over fragments, the estimate may not track the variations in the wireless link bandwidth with time. In addition, the average video fragment throughput is not available until after the first few video fragments are downloaded.

TCP Throughput

Another higher layer approach is to use the TCP estimate of the available link bandwidth which is given by:

$$R_i^{TCP} = \frac{Cwnd}{RTT},$$

where Cwnd is the so-called TCP congestion window and RTT is a signal's estimated round trip time. The variable Cwnd is the TCP's current estimate of the available link bandwidth. Typically Cwnd is increased upon reception of acknowledgements (ACKS) as it is an indication that the network can support a higher bandwidth and it is decreased when it perceives losses (perceived through timeout or duplicate ACKs) as it assumes that losses are due to congestion. There is a slow-start phase in which the Cwnd is increased exponentially upon reception of acknowledgements and there is a congestion avoidance phase in which it is increased linearly upon acknowledgements.

However TCP was designed for wired networks and for bulk applications that continuously send data. It was neither designed for wireless networks nor for application rate-limited applications like HTTP adaptive streaming. The use of TCP to estimate throughput has at least two problems. First, the use of the TCP estimation assumes that wireless losses are also congestion. This assumption unnecessarily decreases the window size even when the actual throughput does not require the decrease. Secondly, the TCP estimation unnecessarily increases the Cwnd even during application rate limited cases. Thus the Cwnd bandwidth estimate can become much higher than the number of TCP packets that the application sends within an RTT period. When the application sends fewer packets than allowed by the Cwnd bandwidth estimate, the TCP is unable to probe the available network bandwidth properly. Thus the Cwnd bandwidth estimate no longer reflects the current available network bandwidth. For these reasons, the use of a TCP based bandwidth estimate is not very appropriate for use in rate-adaptation in HAS over wireless scenarios.

Advantages of Link Layer Goodput

In accordance with one embodiment, link layer goodput can be used as a complement to higher layer estimates. Link layer goodput can track link throughput variations over time, thereby providing a higher scope for opportunistic video rate adaptation and buffer build up to improve the QoE of the user. The use of the link layer represents the actual current goodput that is obtained by the user, unlike higher layer estimates which can be outdated. The link layer goodput can change dramatically in relatively short periods of time. However, the link layer goodput can be averaged over time to present a smooth estimate, thereby avoiding drastic variations, while still capturing the overall trend of the wireless link. Further, the use of link layer goodput avoids some of the disadvantages that a TCP-based bandwidth estimate has for rate-limited applications over wireless channels. Also link layer goodput is available from the first video segment of the streaming session rather than after the download of the first few video segments.

Accordingly, link layer goodput can provide quicker, more accurate knowledge of the actual throughput in a HTTP adaptive stream. This knowledge can then be used to proactively download additional frames to build the buffer when additional bandwidth is available due to changes in the wireless link. In addition, an accurate knowledge of the goodput at the beginning of a HAS session enables quicker startup and better display resolution.

Selected Throughout

In one embodiment, the average link layer goodput can be used in conjunction with higher layer throughputs like video fragment throughput. The throughput that is selected for video rate adaptation can be based on the evolution of changes in wireless link conditions as well as on the buffer level of the HAS client. The selected throughput used for rate adaptation by a representative user in frame slot i can be denoted by $R_i^{Sel}$. In one embodiment, a conservative estimate can be determined based on PHY goodput and segment throughput as follows:

$$R_i^{Sel} = \begin{cases} R_i^{phy} & \text{if } R_i^{seg} > (1+\beta)R_i^{phy} \\ R_i^{seg} & \text{otherwise} \end{cases},$$

where the constant $\beta$ prevents short term variations in link conditions from changing the rate adaptation. This conservative method can be used in the steady state because typically PHY goodput responds quickly to wireless link variations, while segment throughput responds much more slowly to link variations.

In the startup phase of a HAS session, the relationship $R_i^{Sel} = \chi R_i^{phy}$ may be used for obtaining better video quality. The variable $\chi$ is less than or equal to one and is a scaling factor that can be used to obtain a design tradeoff between startup video quality and startup delay. The value of $\chi$ can be set based on user QoE preferences. These are only representative examples and other generalized conditions based on client buffer state and link conditions can be used to determine the selected throughput for HAS video rate adaptation.

Buffer Evolution and Tracking

In order to request the appropriate representation level, the client can keep track of the frames requested, received, buffered and played back. FIG. 3 shows the frame tracking done by the UE client. $N_i$ and $Q_i$ respectively represent the number of frames and the representation level requested in frameslot i, i.e., at the end of each frameslot i the client requests from the server $N_i$ frames at a representation level $Q_i$, as determined by the rate adaptation algorithm. The client can decide on $N_i$ and $Q_i$ based on the physical layer goodput as well as the segment throughput determined at higher levels.

Figure 4:
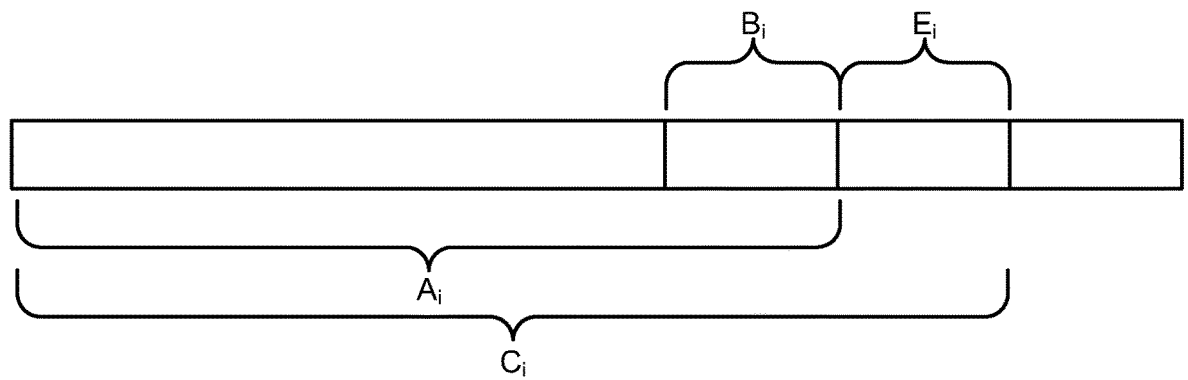
FIG. 4 illustrates a diagram of frame levels used by a client to compute a number of frames and representation level in accordance with an example.

FIG. 4 provides an example illustration of video frame tracking. The variables $A_i$, $B_i$, $C_i$, and $E_i$ represent the various frame levels that the client uses in computing $N_i$ and $Q_i$. The variable $A_i$ represents the total number of video frames received by the client before the client makes its request in frameslot i. The variable $B_i$ represents the number of frames in the client buffer that are available for playback and $C_i$ represents the number of frames requested by the client:

$$C_i = \sum_{j=1}^{i-1} N_j.$$

The variable $E_i$ represents the number of video frames requested, but not received, by the client. The client can estimate $E_i$ based on the total requested and received frames. For instance:

$$E_i = C_i - A_i$$

The buffer evolution is closely related to the PHY goodput experienced by the user. Let $b_{i,k}$ represent the rate of the video representation level downloaded in frameslot i. Then the number of frames that enter the client buffer in frameslot i is:

$$\beta_i = \frac{R_i}{b_{i,k}},$$

where βi is the ratio of the goodput at the link layer to the rate of the video representation level. It represents the rate at which the client buffer is being filled.

Client States

Figure 5:
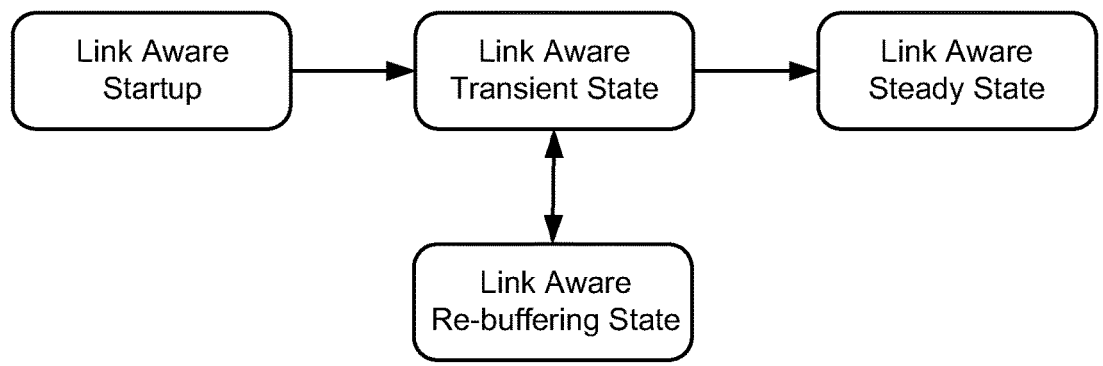
FIG. 5 illustrates a diagram of link aware adaptive streaming client player states in accordance with an example.

The central intelligence in HTTP Adaptive Streaming (HAS) resides in the client rather than the server. The adaptation level of the video segment to be downloaded is determined by the client and communicated to the server periodically within the adaptive streaming session. Based on the frame levels, the operation of the client player in our link-aware adaptive streaming framework can be characterized into four modes or states, as illustrated in FIG. 5: i) Startup; ii) a Transient State; iii) a Steady State; or iv) a Re-buffering State.

The startup mode represents the initial buffering mode, during which the client buffers video frames to a certain limit before beginning to playback the video or audio delivered by HAS. The steady state represents the state in which the UE buffer level is above a certain threshold. The transient state is the state in which the UE buffer level falls below a certain limit after beginning to playback. The re-buffering state is the state that the client enters when the buffer level becomes zero after beginning to playback and it remains in that state until it rebuilds its buffer level to a satisfactory level to begin playback again. It should be noted that the client does not playback the multimedia only during startup and re-buffering modes.

Link-Aware Rate Adaptation Framework

In accordance with one embodiment, the client operating on a wireless device can determine the number of frames $N_i$ and the video representation level $Q_i$ in every frameslot i. One example of a link aware rate adaptation algorithm is illustrated in the flowchart of FIG. 6.

Figure 6:
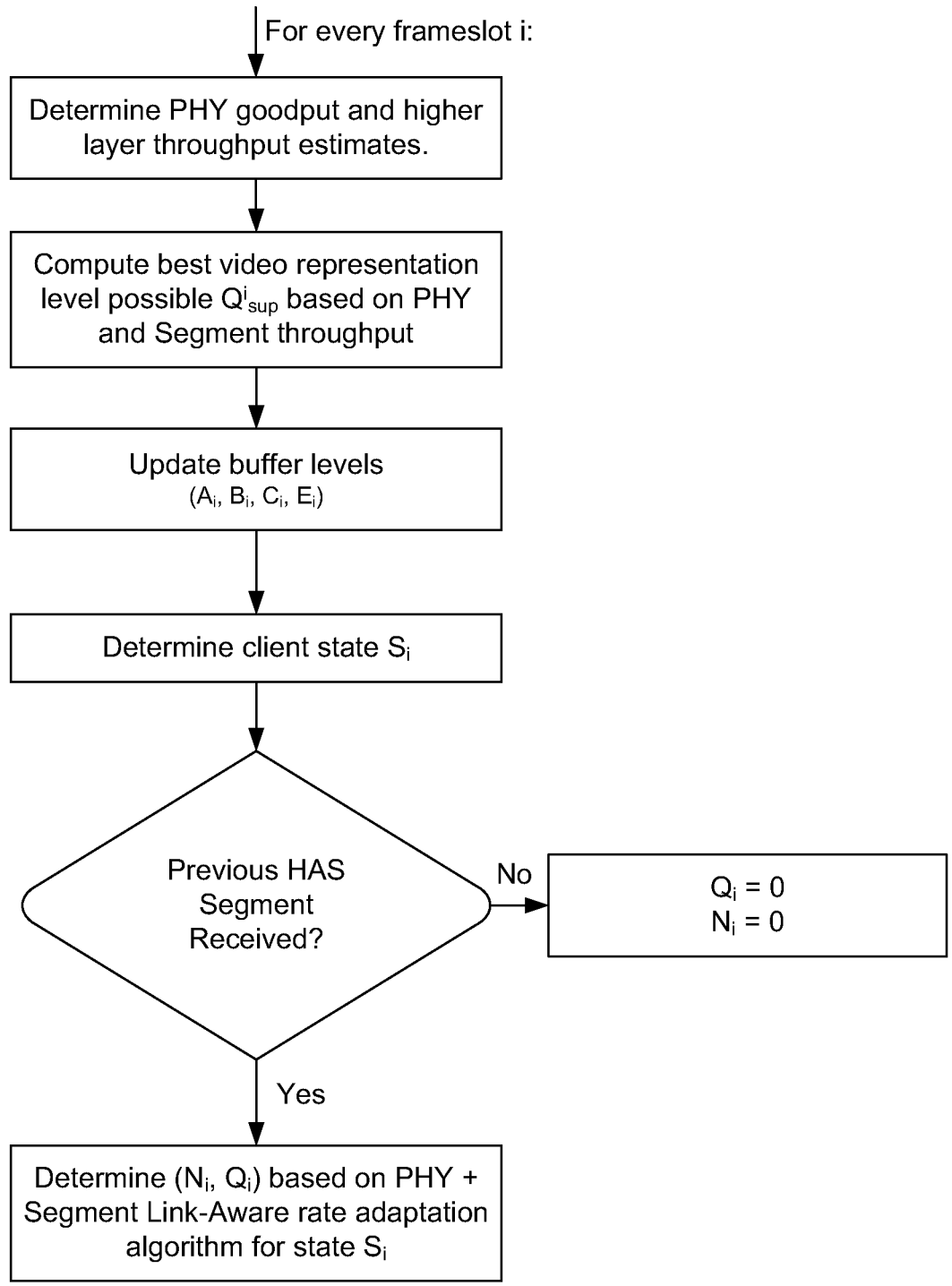
FIG. 6 illustrates a link aware rate adaptation flow chart in accordance with an example.

FIG. 6 illustrates a link aware HAS Rate adaptation algorithm which does not include a replace request feature. The algorithm is illustrated for a HAS client j in frameslot i. In this example embodiment, the HAS client can compute in each frameslot an estimate of HAS segment throughput as well as PHY layer goodput. The client can then compute the best video representation level possible, conservatively, based on both the throughput estimates. For this purpose, a conservative estimate of maximum throughput can be determined based on PHY goodput and segment throughputs as follows:

$$R_i^{con} = \begin{cases} R_i^{phy} & \text{if } R_i^{seg} > (1+\beta)R_i^{phy} \\ R_i^{seg} & \text{otherwise} \end{cases}$$

Where $R_i^{phy}=R^{phy}(i\tau)$, $R_i^{seg}=R^{seg}(i\tau)$, and the constant β in the above equation is used to take into account short term variations in wireless link conditions. When link conditions are good, $R_i^{phy}>R_i^{seg}$ and when link conditions are bad $R_i^{phy}<R_i^{seg}$. This approach ensures: i) when the link conditions are bad and segment throughput is unable to follow the variation in link conditions, then the PHY goodput can be used to lower the estimate of the link bandwidth that is used for video rate adaptation and ii) when link conditions are good, the segment throughput is a conservative estimate. The video quality can be as good as the quality is when using PHY link-unaware approach while allowing the segment throughput to catch up with the link throughput. The best video representation level possible in frameslot i, $Q_i^{sup}$, is determined conservatively based on $R_i^{con}$:

$$Q_i^{sup} = \underset{k}{\text{argmax}}\, b_k;$$

$$\text{s.t. } b_k \leq R_i^{con}; k = 1, 2, \ldots, N$$

Delay Bounded Quality Optimization

In one embodiment, the video quality can be optimized subject to a constraint on delay. A target time $T_{thresh}^{StartUp}$ is set. During the target time, the startup phase is to be completed by downloading all of the frames required for startup. Within this constraint, an attempt is made to optimize the video quality during the startup phase. The algorithm can be summarized using the flowchart in FIG. 7. Details of the algorithm can be summarized as follows:

Delay Bounded Quality Optimization: In Every Frameslot i

1. Determine the minimum required frame download rate:

$$F_i^{min} = \frac{\text{\# Frames Required}}{\text{Time Available}} = \frac{B_{thresh}^{StartUp} - B_i}{\max(T_{thresh}^{StartUp} - i \cdot \tau, \tau)},$$

where $B_i$ is the current buffer level in terms of video frames and $B_{thresh}^{StartUp}$ is the threshold number of frames required in the buffer to start playback.

2. Compute the frame download rate for all video representation level under current link conditions. The frame download rate for video representation level with rate $b_k$ is given by:

$$f_k = \frac{R_i^{PHY-Avg}}{b_k \cdot \tau}$$

Note that the frame download for a representation level is directly proportion to the PHY goodput and inversely proportional to the rate of the video representation level.

3. Select the best video representation level such that $f_k \geq F_i^{min}$ i.e., $$Q_i = \underset{k}{\text{argmax}}\, b_k; f_k \leq F_i^{min} \text{ over } k = 1, 2, \ldots, N$$

$$N_i = 1$$

Figure 7A:
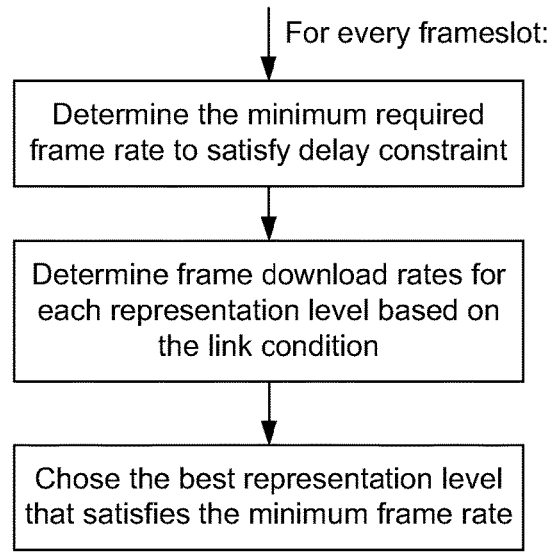
FIG. 7a illustrates a delay bounded quality optimized startup flowchart in accordance with an example.

FIG. 7a provides a flow chart illustrating a delay bounded quality optimized startup. For each frameslot, the minimum required frame rate can be determined to satisfy a delay constraint. The frame download rates can then be determined for each representation level based on the link condition. The best representation level can be chosen that satisfies the minimum threshold. The threshold $B_{thresh}^{StartUp}$ and $T_{thresh}^{StartUp}$ can be adjusted to obtain a tradeoff between video quality and startup (buffering) delay.

Figure 7B:
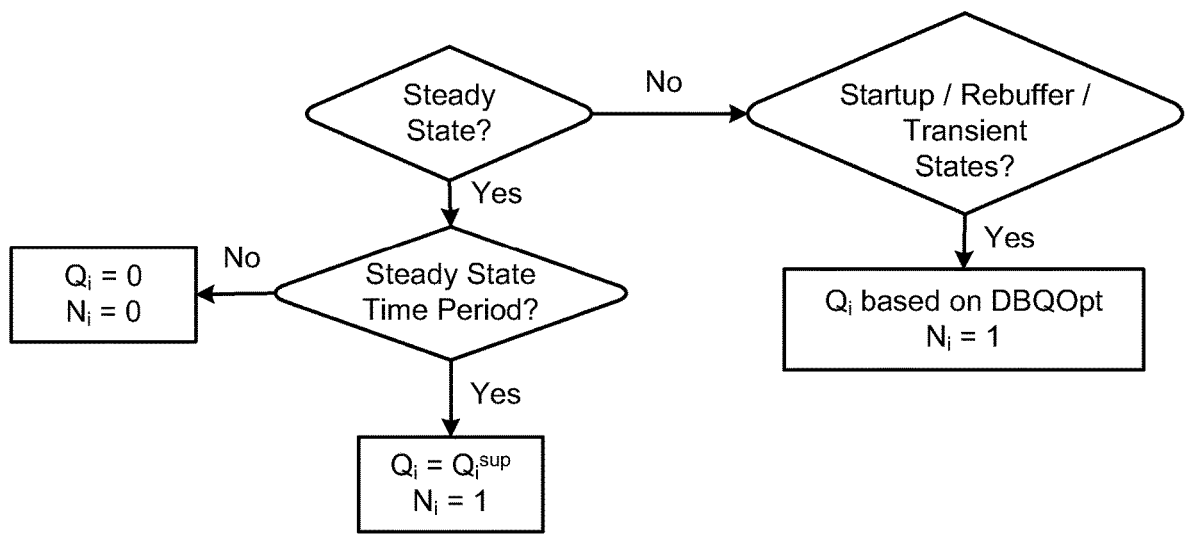
FIG. 7b illustrates a state-dependent link-aware HAS client rate adaptation in accordance with an example.

After determining the best representation level, the buffer levels can be updated and the HAS client can update its state. Then, if the previously requested segment has not been received, the HAS client can wait for the next frameslot. If the previous video segment has been received, then depending on the HAS client state a new segment may be requested. FIG. 7b illustrates an example of a state-dependent link-aware HAS client rate adaptation. Based on the startup/rebuffer/transient states, the $Q_i$ value can be selected based on the delay bounded quality optimization (DBQOpt) with $N_i=1$.

Identify Link Bandwidth Tunnels

PHY layer goodput can be reported to the application/client through an API in a periodic manner every T seconds. In one embodiment, the variable $R^{phy}(k)$ can denote the physical layer goodput during the kth PHY layer throughput feedback cycle. The values $R^{phy}(1) \ldots R^{phy}(k)$ can represent the sequence of PHY layer goodput samples from cycle 1 to cycle k. At a time t, the feedback cycle number can be given by $$m = \left\lfloor \frac{t}{T} \right\rfloor.$$

The past N samples can be used to determine the trend of the wireless channel i.e., $R^{phy}(m-N+1), \ldots, R^{phy}(m)$. The slope of the linear fit of the samples can be determined as $R^{phy}(m-N+1), \ldots, R^{phy}(m)$ at time t. This slope, denoted by s(t), determines the trend of the link bandwidth. The sign of s(t) indicates the direction of change, and it magnitude indicates the steepness of change in radio link bandwidth. Steep descents can be identified in link layer bandwidths if s(t) is negative and the magnitude of s(t) is greater than a threshold i.e., $|s(t)|>\delta$. When the value of $s(t) \leq -\delta$ it is referred to as a link bandwidth tunnel condition.

When the channel is falling steeply, the PHY layer goodput estimate closely follows the actual link bandwidth. The conservative estimate $R_i^{con}$ is equal to this estimate. However, when the link bandwidth fall is steep, as when $s(t) \leq -\delta$, certain other corrective actions may have to be taken by the HAS client in addition to using a conservative estimate for future segment requests.

Figure 8:
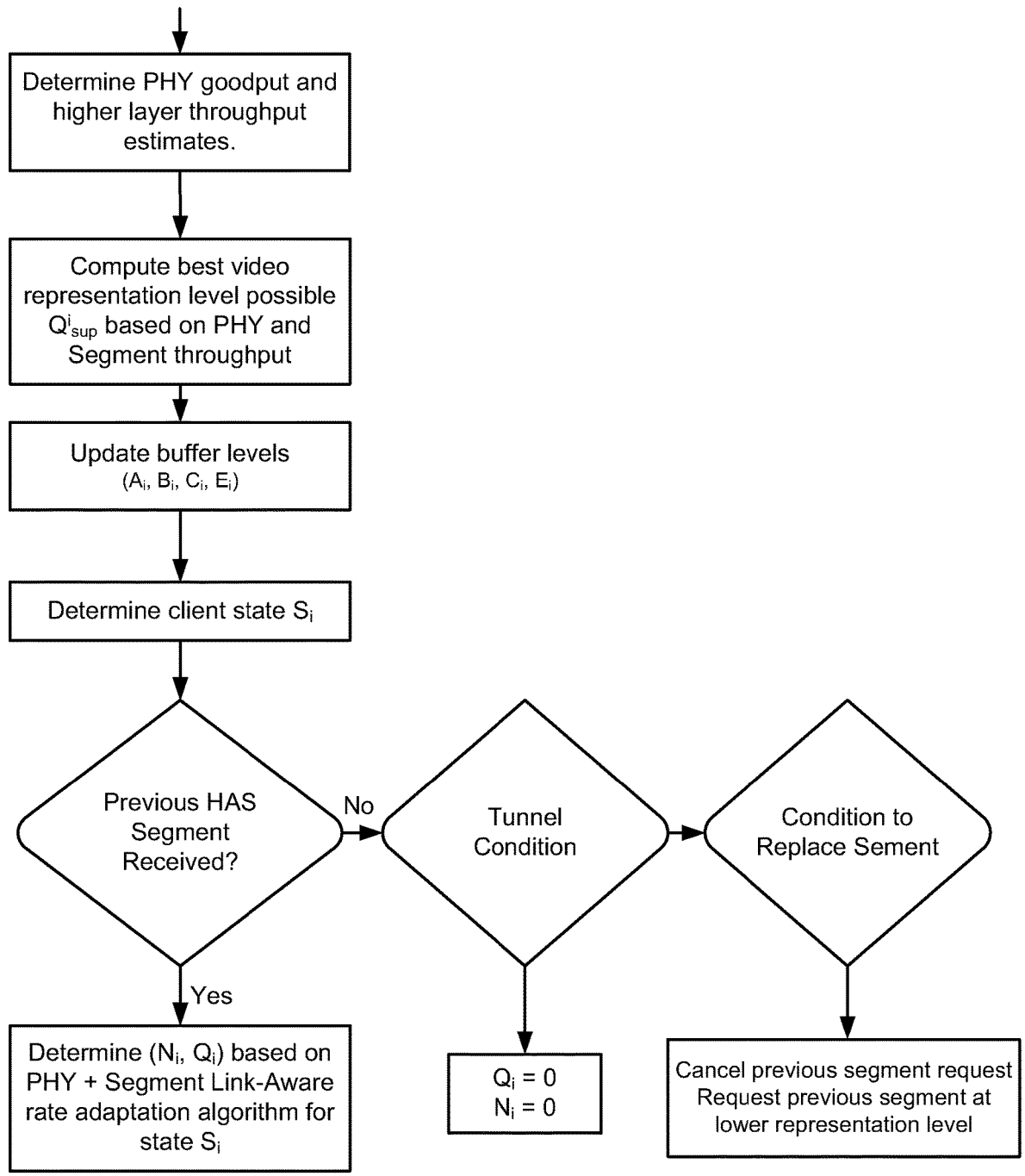
FIG. 8 illustrates a flow diagram for a link aware HAS rate adaptation with a replace request feature in accordance with an example.

FIG. 8 shows a flow diagram for an example link aware HAS rate adaptation with a replace request feature. In accordance with one embodiment of the present invention, the replace request feature can be used in conjunction with the link-aware streaming adaptation described in the preceding paragraphs. In this enhancement to HAS, link-awareness can be used to identify tunnel conditions in which the radio link bandwidth falls steeply.

When a previously requested segment has not been received completely, the tunnel condition can be checked. If the tunnel condition is false, then the HAS client can set Ni=0 and Qi=0. However, if the previous HAS segment has not been received and the tunnel condition is satisfied (i.e. $s(t) \leq -\delta$), then the HAS client can proceed to check further conditions to determine whether or not to replace the previous segment request.

If a certain set of conditions is satisfied, then the previous segment request can be cancelled at the server and a new request of the same video segment at a lower quality level can be placed by the HAS client. The set of conditions tested can involve a combination of the duration of the video segment received, the size of the video segment received, and a client media buffer level.

Figure 9:
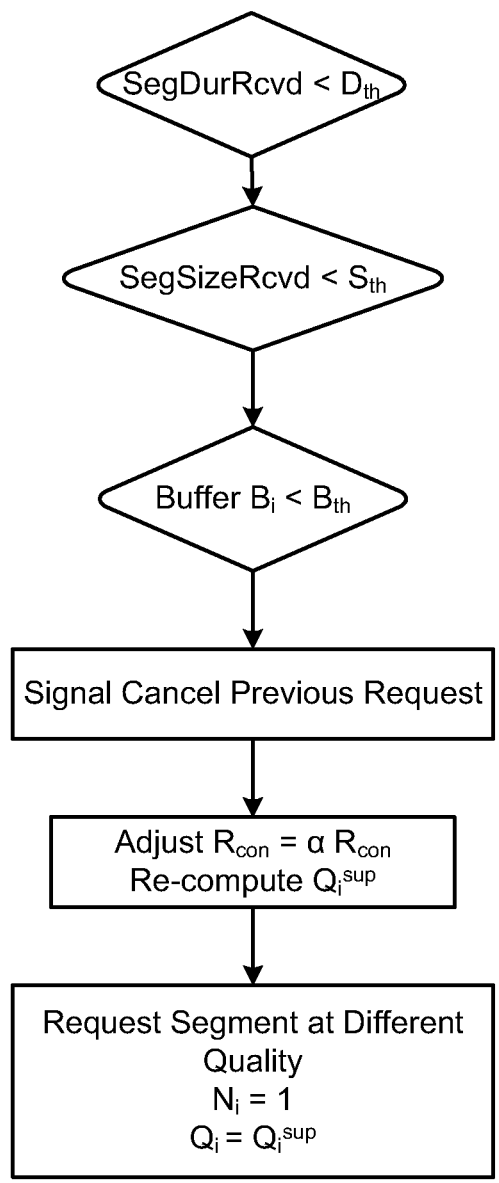
FIG. 9 illustrates a flow chart of an algorithm to select a quality of a replaced segment in accordance with an example.

One example embodiment of the set of conditions and an algorithm to choose the quality of the replaced segment is shown in FIG. 9. In this example, the Replace Request feature is used only when the duration of video segment received (SegDurRcvd) is less than a threshold value Dth, the size of the segment received is less than a threshold value Sth, and the buffer level at the client is less than a threshold value Bth. If these conditions are satisfied, then the HAS client signals the server to cancel the previous video segment requested.

In addition, the conservative estimate of throughput $R_i^{con}$ can be reduced by a constant value α, where α is less than 1, and the best video representation level possible in frameslot i, $Q_i^{sup}$, can be recalculated. A new request of the same video segment at a lower quality level can be placed by the HAS client. The value $N_i$ can be reset to 1, and the video representation level can be set to the recalculated value of $Q_i^{sup}$.

Figure 10:
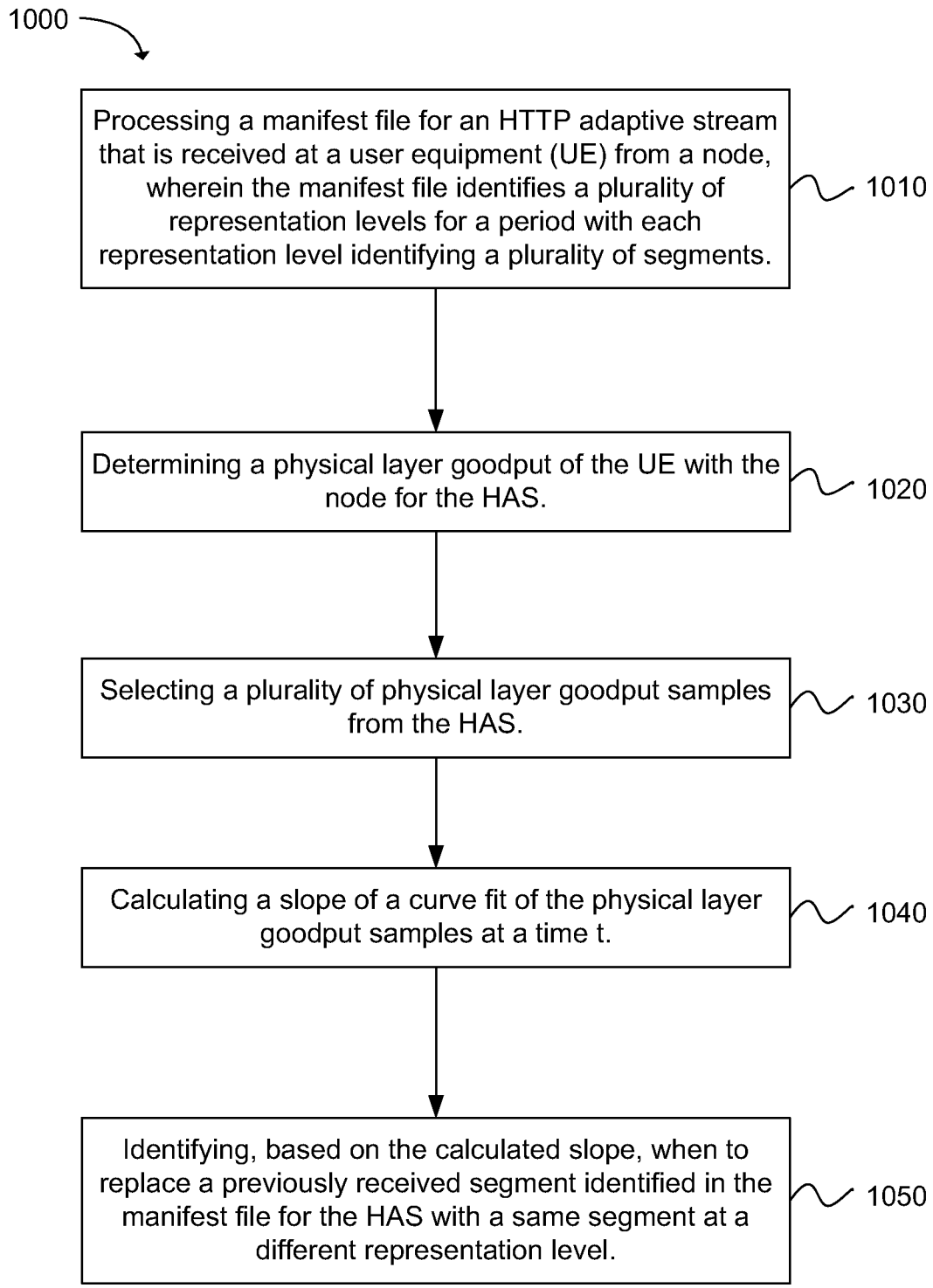
FIG. 10 depicts a flow chart for a computer readable storage medium having instructions embodied thereon, the instructions which when executed by one or more processors perform operations to provide hyper-text transfer protocol (HTTP) adaptive streaming (HAS) in accordance with an example.

One example embodiment provides a non-transitory machine readable storage medium having instructions 1000 embodied thereon, the instructions which when executed by one or more processors perform the following operations to provide hyper-text transfer protocol (HTTP) adaptive streaming (HAS), as shown in the flow chart of FIG. 10. The operations comprise processing a manifest file for an HTTP adaptive stream that is received at a user equipment (UE) from a node, as shown in block 1010. The manifest file identifies a plurality of representation levels for a period. Each representation level can identify a plurality of segments, as described in FIG. 1.

A further operation of the instructions 1000 comprises determining a physical layer goodput of the UE with the node for the HAS, as shown in block 1020. A plurality of physical layer goodput samples can be selected from the HAS, as shown in block 1030. A slope of a curve fit of the physical layer goodput samples taken at a time t can be calculated, as shown in block 1040. In one embodiment, the curve fit can be a linear curve fit of the physical layer goodput samples. The time can be a time period over which the slope is calculated.

An additional operation of the instructions 1000 comprises identifying, based on the calculated slope, when to replace a previously received segment identified in the manifest file for the HAS with a same segment at a different representation level. For example, the same segment in a lower representation or a higher representation can be used to replace the received segment. As used herein, the term higher representation is used to refer to a representation with a higher data rate, such as moving from Representation 2 106 with a data rate of 2 Mbps in FIG. 1 to the Representation 1 with a data rate of 5 Mbps. Conversely, the term lower representation is used to refer to a representation with a lower data rate, such as moving from the Representation 2 with a data rate of 2 Mbps to the Representation 3 at 500 Kbps.

The instructions 1000 can further comprise the operations of determining when the slope is negative; identifying when the negative slope is greater than a predetermined threshold, such as i.e., $|s(t)|>\delta$, and classifying the negative slope that is greater the predetermined threshold as a link bandwidth tunnel condition. In one example, when there is a link bandwidth tunnel condition, then a previously received segment may be replaced based on a set of conditions. A status of a replace segment condition set can be monitored when the link bandwidth tunnel condition occurs. Alternatively, the status can be monitored even when the link bandwidth tunnel condition has not occurred. The replace segment condition set is a set of conditions for the previously received segment comprising: a segment duration received for the previously received segment at the UE is less than a duration threshold value; a segment size received for the previously received segment at the UE is less than a size threshold value; and a buffer level at a HAS client operating at the UE is less than a buffer threshold value. In one embodiment, when all of the conditions have been met, then the status of the replace segment condition set is true.

The instructions 1000 can further comprise the operations of canceling a request for the previously received segment based on the status of the replace segment condition set and the link bandwidth tunnel condition; and requesting the previously received segment to be sent to the UE at the lower representation level. For example, a lower representation can be sent when the slope is negative. Alternatively, a higher representation can be sent when the slope is positive. Different thresholds may be set for positive slope and negative slope. A further instruction comprises reducing a throughput value by a constant amount when the status of the replace segment condition is true and the bandwidth tunnel condition occurs. Alternatively, if the threshold for the positive slope is met, the throughput value may be increased by a constant amount when the status of the replace segment condition is true.

Figure 11:
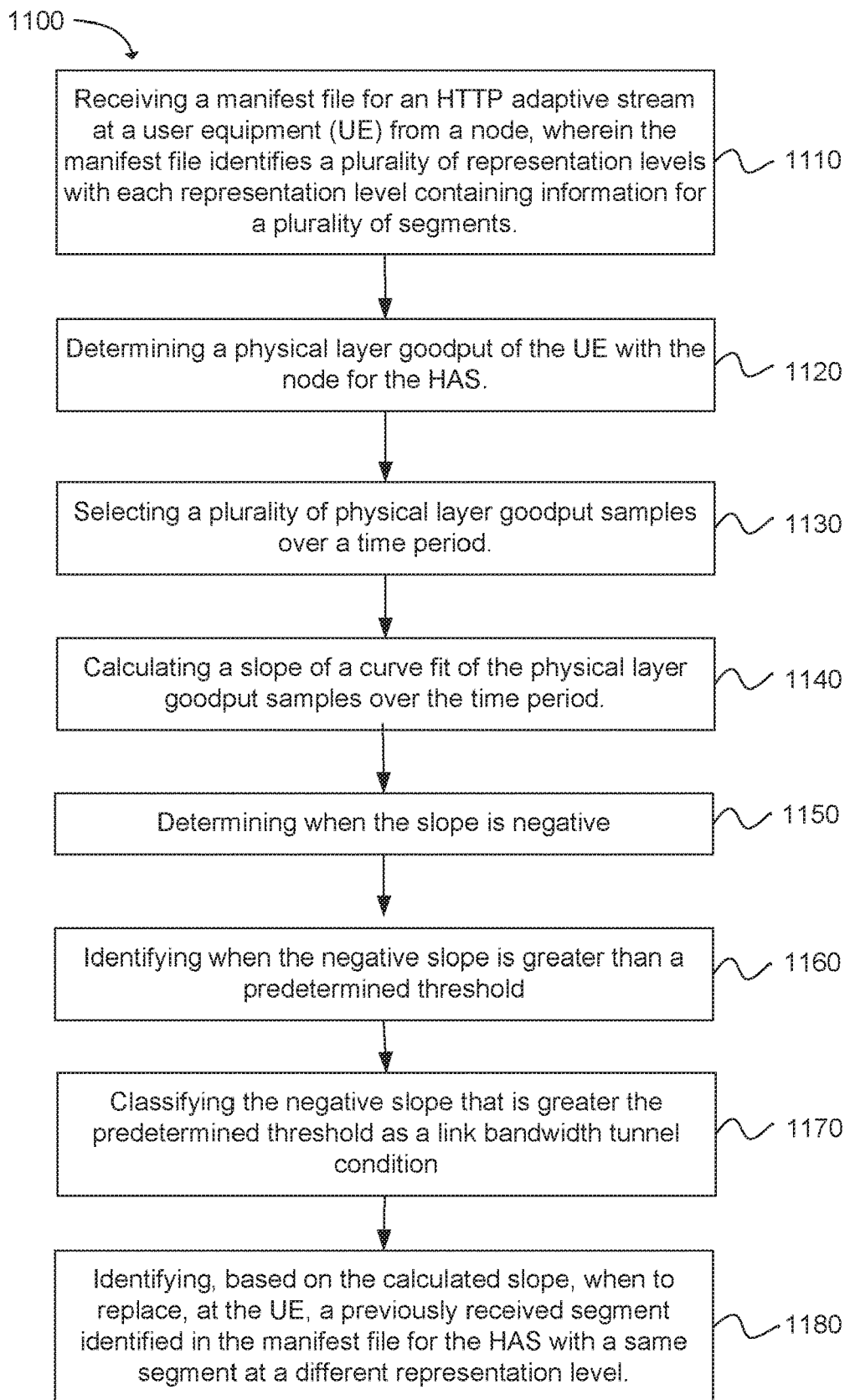
FIG. 11 depicts a flow chart of a method for providing HAS is disclosed in accordance with an example.

In another example, a method 1100 for providing hyper-text transfer protocol (HTTP) adaptive streaming (HAS) is disclosed, as depicted in the flow chart of FIG. 11. The method may be executed as instructions on a machine, computer circuitry, or one or more processors for a mobile device (e.g. UE), where the instructions are included on at least one computer readable medium or one non-transitory machine readable storage medium. The method includes the operation of receiving a manifest file for an HTTP adaptive stream at a user equipment (UE) from a node, as shown in block 1110. The manifest file can be used to identify a plurality of representation levels with each representation level containing information for a plurality of segments. Further operations comprise: determining a physical layer goodput of the UE with the node for the HAS, as shown in block 1120; selecting a plurality of physical layer goodput samples over a time period, as shown in block 1130; calculating a slope of a curve fit of the physical layer goodput samples over the time period, as shown in block 1140; and identifying, based on the calculated slope, when to replace, at the UE, a previously received segment identified in the manifest file for the HAS with a same segment at a different representation level, as shown in block 1150. As previously discussed, the curve fit may be a linear curve fit that is used to calculate the slope.

The method 1100 can further comprise the operations of determining when the slope is negative; identifying when the negative slope is greater than a predetermined threshold; and classifying the negative slope that is greater than the predetermined threshold as a link bandwidth tunnel condition.

In the method 1100, a status of a replace segment condition set can be monitored. In one embodiment, the set can be monitored when the link bandwidth tunnel condition occurs. Alternatively, the set can be monitored independent of the link bandwidth tunnel condition. The replace segment condition set is a set of conditions for the previously received segment comprising: a segment duration received at the UE of the previously received segment is less than a duration threshold value; a segment size received at the UE of the previously received segment is less than a size threshold value; and a buffer level at a client for the HAS that is operating at the UE is less than a buffer threshold value.

The method 1100 can further comprise canceling a previous segment request based on the status of the replace segment condition set and the link bandwidth tunnel condition; and requesting the previous segment to be sent to the UE at a lower representation level. As used in the method, the terms lower and upper representation have the same meaning as previously defined. The method can further comprise canceling a previous segment request based on the status of the replace segment condition set, when the slope of the calculated slope of the curve fit is positive, and when the slope is greater than a selected threshold; and requesting the previous segment to be sent to the UE at a higher representation level.

The method 1100 can further comprise the operation of reducing a throughput value by a constant amount when the status of the replace segment condition is true and the bandwidth tunnel condition occurs. In addition, a throughput value can be increased by a constant amount when the status of the replace segment condition is true and the calculated slope of the curve fit is positive and is greater than the selected threshold.

Figure 12:
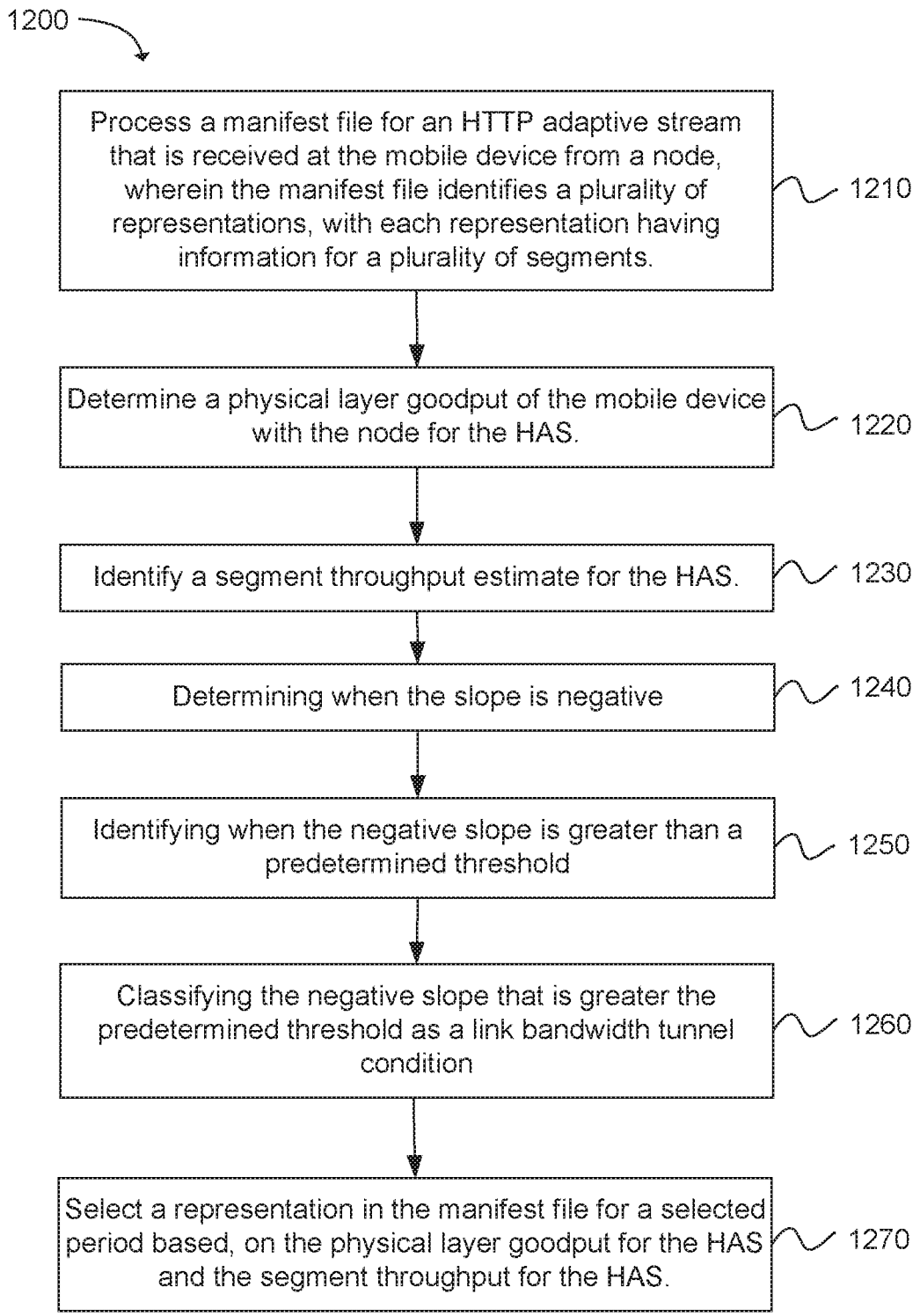
FIG. 12 depicts functionality of one or more processors of a mobile device operable to receive HAS, in accordance with an example.

Another example provides functionality 1200 of one or more processors of a mobile device operable to receive hyper-text transfer protocol (HTTP) adaptive streaming (HAS), as shown in the flow chart in FIG. 12. The functionality may be implemented as a method or the functionality may be executed as instructions on a machine, where the instructions are included on at least one computer readable medium or one non-transitory machine readable storage medium. As described herein, the processors can be both digital processors configured to process digital data, and baseband processors configured to assist transceivers in sending and receiving data.

The one or more processors can be configured to process a manifest file for an HTTP adaptive stream that is received at the mobile device from a node, as in block 1210. The manifest file can identify a plurality of representations, with each representation having information for a plurality of segments. The one or more processors can be further configured to determine a physical layer goodput of the mobile device with the node for the HAS, as in block 1220, identify a segment throughput estimate for the HAS, as in block 1230; and select a representation in the manifest file for a selected period based, on the physical layer goodput for the HAS and the segment throughput for the HAS, as in block 1240.

The one or more processors can be further configured to request a selected number of segments from the node that are in a representation identified in the manifest file, based on the physical layer goodput for the HAS and the segment throughput estimate for the HAS. In addition, the processor(s) can be configured to select the representation for a selected period based, at least in part, on one of the physical layer goodput for the HAS and the segment throughput estimate for the HAS from a transport layer or the segment throughput estimate for the HAS from an application layer.

In one embodiment, the processor(s) can be configured to select a throughput used for rate adaptation in frame slot i as:

$$R_i^{Sel} = \begin{cases} R_i^{phy} & \text{if } R_i^{seg} > (1+\beta)R_i^{phy} \\ R_i^{seg} & \text{otherwise} \end{cases},$$

where $R_i^{phy}$ is a number of successfully received bits per video frame duration, $R_i^{seg}$ is an average ratio of a segment size of a segment to a download time of the segment, and $\beta$ is a ratio of goodput at a link layer to a rate at a video representation level.

In another embodiment, the processor(s) can be configured to: select a plurality of physical layer goodput samples from the HAS; calculate a slope of a linear fit of the physical layer goodput samples at a time t; and determine a change in bandwidth at the physical layer based on the slope. The processors can identify when the change in bandwidth is negative and the change in bandwidth is greater than a selected threshold to create a link bandwidth tunnel condition. In addition, the processors can be configured to check a replace segment condition set when the link bandwidth tunnel condition occurs.

The replace segment condition can comprise: a segment duration received is less than a duration threshold value; a segment size received is less than a size threshold value; and a buffer level at a client operating on the mobile device is less than a buffer threshold value. The processor(s) can be further configured to cancel a previous segment request based on the replace segment condition set and the link bandwidth condition; and request the previous segment at a different representation level. In one embodiment, the processors can be configured to reduce a throughput value by a constant amount when the replace segment condition set is true and the bandwidth tunnel condition occurs.

Figure 13:
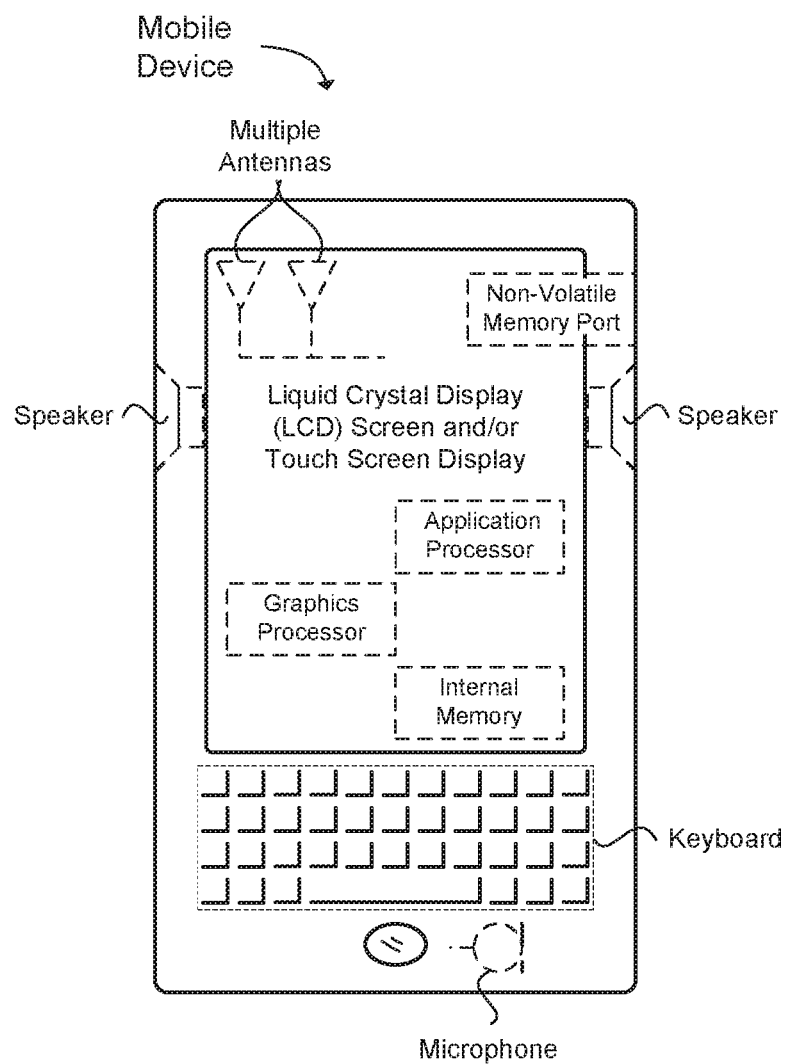
FIG. 13 illustrates a diagram of a wireless device (e.g., UE) in accordance with an example.

FIG. 13 provides an example illustration of the mobile device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 13 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented using one or more digital processors and/or as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays (FPGAs), programmable array logic, programmable logic devices or the like.

As used herein, the term processor can include both general purpose processors, specialized processors such as VLSI, FPGAs, and other types of specialized processors, as well as base band processors used in transceivers to send, receive, and process wireless communications.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. At least one non-transitory machine readable storage medium having instructions embodied thereon, the instructions which when executed by one or more processors perform the following operations to provide hyper-text transfer protocol (HTTP) adaptive streaming (HAS), the operations comprising:
    processing a manifest file for an HTTP adaptive stream that is received at a user equipment (UE) from a node, wherein the manifest file identifies a plurality of representation levels for a period with each representation level identifying a plurality of segments;
    determining a physical layer goodput of the UE with the node for the HAS for video rate adaptation;
    selecting a plurality of physical layer goodput samples from the HAS;
    calculating a slope of a curve fit of the physical layer goodput samples at a time t;
    determining when the slope is negative;
    identifying when the negative slope is greater than a predetermined threshold;
    classifying the negative slope that is greater the predetermined threshold as a link bandwidth tunnel condition;
    monitoring a status of a replace segment condition set when the link bandwidth tunnel condition occurs, wherein the replace segment condition set is a set of conditions for a previously received segment identified in the manifest file comprising a segment size received for the previously received segment at the UE is less than a size threshold value;
    identifying, based on the calculated slope, a video segment representation to be requested and when to replace the previously received segment identified in the manifest file for the HAS with a same segment at a different representation level; and
    replacing the previously received segment identified in the manifest file with the same segment at the different representation level when the calculated slope of the curve fit of the physical layer goodput samples is negative and classified as the link bandwidth tunnel condition.

2. The at least one non-transitory machine readable storage medium of claim 1, wherein the replace segment condition set is a set of conditions for the previously received segment comprising:
    a segment duration received for the previously received segment at the UE is less than a duration threshold value; and
    a buffer level at a HAS client operating at the UE is less than a buffer threshold value.

3. The at least one non-transitory machine readable storage medium of claim 2, further comprising instructions, which, when executed by the one or more processors, comprises:
    canceling a request for the previously received segment based on the status of the replace segment condition set and the link bandwidth tunnel condition; and
    requesting the previously received segment to be sent to the UE at the lower representation level.

4. The at least one non-transitory machine readable storage medium of claim 2, further comprising instructions, which, when executed by the one or more processors, comprises:
    reducing a throughput value by a constant amount when the status of the replace segment condition is true and the bandwidth tunnel condition occurs.

5. A method of providing hyper-text transfer protocol (HTTP) adaptive streaming (HAS), the operations comprising:
    receiving a manifest file for an HTTP adaptive stream at a user equipment (UE) from a node, wherein the manifest file identifies a plurality of representation levels with each representation level containing information for a plurality of segments;
    determining a physical layer goodput of the UE with the node for the HAS for video rate adaptation;
    selecting a plurality of physical layer goodput samples over a time period;
    calculating a slope of a curve fit of the physical layer goodput samples over the time period;
    determining when the slope is negative;
    identifying when the negative slope is greater than a predetermined threshold;
    classifying the negative slope that is greater the predetermined threshold as a link bandwidth tunnel condition;
    monitoring a status of a replace segment condition set when the link bandwidth tunnel condition occurs, wherein the replace segment condition set is a set of conditions for a previously received segment identified from the manifest file comprising a segment size received at the UE of the previously received segment is less than a size threshold value;

identifying, based on the calculated slope, a video segment representation to be requested;
identifying when to replace, at the UE, the previously received segment identified in the manifest file for the HAS with a same segment at a different representation level or request a new segment; and
replacing the previously received segment identified in the manifest file with the same segment at the different representation level based on the calculated slope; or
requesting the new segment and replacing the previously received segment identified in the manifest file with a new segment received from the node when the calculated slope of the curve fit of the physical layer goodput samples is negative and classified as the link bandwidth tunnel condition.

6. The method of claim 5, wherein the replace segment condition set is a set of conditions for the previously received segment comprising:
a segment duration received at the UE of the previously received segment is less than a duration threshold value; and
a buffer level at a client for the HAS that is operating at the UE is less than a buffer threshold value.

7. The method of claim 6, further comprising:
canceling a previous segment request based on the status of the replace segment condition set and the link bandwidth tunnel condition; and
requesting the previous segment to be sent to the UE at a lower representation level.

8. The method of claim 6, further comprising:
canceling a previous segment request based on:
the status of the replace segment condition set; and
the slope of the calculated slope of the curve fit is positive and is greater than a selected threshold; and
requesting the previous segment to be sent to the UE at a higher representation level.

9. The method of claim 6, further comprising reducing a throughput value by a constant amount when the status of the replace segment condition is true and the bandwidth tunnel condition occurs.

10. The method of claim 8, further comprising increasing a throughput value by a constant amount when the status of the replace segment condition is true and the calculated slope of the curve fit is positive and is greater than the selected threshold.

11. A mobile device operable to receive hyper-text transfer protocol (HTTP) adaptive streaming (HAS), having one or more processors configured to:
process a manifest file for an HTTP adaptive stream that is received at the mobile device from a node, wherein the manifest file identifies a plurality of representations, with each representation having information for a plurality of segments;
determine a physical layer goodput of the mobile device with the node for the HAS;
identify a new or previous segment throughput estimate for the HAS and a representation to be requested;
calculate a slope of a curve fit of the new or previous segment throughput estimate at a time t;
determine when the slope is negative;
identify when the negative slope is greater than a predetermined threshold;
classify the negative slope that is greater the predetermined threshold as a link bandwidth tunnel condition;
check a replace segment condition set when the link bandwidth tunnel condition occurs, wherein the replace segment condition set comprises a segment size received is less than a size threshold value;
select a representation in the manifest file for a selected period based, on the physical layer goodput for the HAS and a segment throughput for the HAS;
select a throughput used for rate adaptation in frame slot i as:

$$R_i^{Sel} = \begin{cases} R_i^{phy} & \text{if } R_i^{seg} > (1+\beta)R_i^{phy} \\ R_i^{seg} & \text{otherwise} \end{cases},$$

where $R_i^{phy}$ is a number of successfully received bits per video frame duration, $R_i^{seg}$ is an average ration of a segment size of a segment to a download time of the segment, and $\beta$ is a ratio of goodput at a link layer to a rate at a video representation level; and
request the representation and replace a previous segment identified in the manifest file with a new segment received from the node when the calculated slope of the curve fit of the segment throughout estimate is negative and classified as the link bandwidth tunnel condition.

12. The mobile device of claim 11, wherein the one or more processors are further configured to:
request a selected number of segments from the node that are in a representation identified in the manifest file, based on the physical layer goodput for the HAS and the segment throughput estimate for the HAS.

13. The mobile device of claim 11, wherein the one or more processors are further configured to:
select the representation for a selected period based, at least in part, on one of the physical layer goodput for the HAS and the segment throughput estimate for the HAS from a transport layer or the segment throughput estimate for the HAS from an application layer.

14. The mobile device of claim 11, wherein the one or more processors are further configured to:
select a plurality of physical layer goodput samples from the HAS;
calculate a slope of a linear fit of the physical layer goodput samples at a time t; and
determine a change in bandwidth at the physical layer based on the slope.

15. The mobile device of claim 14, wherein the one or more processors are further configured to:
identify when the change in bandwidth is negative and the change in bandwidth is greater than a selected threshold to create a link bandwidth tunnel condition.

16. The at least one non-transitory machine readable storage medium of claim 1, wherein the replace segment condition set comprises:
a segment duration received is less than a duration threshold value; and
a buffer level at a client operating on the mobile device is less than a buffer threshold value.

17. The mobile device of claim 15, wherein the one or more processors are further configured to:
cancel a previous segment request based on the replace segment condition set and the link bandwidth condition; and
request the previous segment at a different representation level.

18. The at least one non-transitory machine readable storage medium of claim 16, further comprising instructions, which, when executed by the one or more processors, comprises:

reducing a throughput value by a constant amount when the replace segment condition set is true and the bandwidth tunnel condition occurs.

\* \* \* \* \*